(12) United States Patent
McCoy et al.

(10) Patent No.: US 10,227,000 B1
(45) Date of Patent: Mar. 12, 2019

(54) SELECTABLE FOUR-WHEEL DRIVE SYSTEM

(71) Applicant: Hydro-Gear Limited Partnership, Sullivan, IL (US)

(72) Inventors: K. Mike McCoy, Gays, IL (US); Christopher K. Wyatt, Bradenton, FL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 97 days.

(21) Appl. No.: 15/360,287

(22) Filed: Nov. 23, 2016

Related U.S. Application Data

(60) Division of application No. 14/263,541, filed on Apr. 28, 2014, now Pat. No. 9,505,304, which is a
(Continued)

(51) Int. Cl.
*B60K 17/354* (2006.01)
*B60K 17/356* (2006.01)
(Continued)

(52) U.S. Cl.
CPC .............. *B60K 17/354* (2013.01); *B60K 1/02* (2013.01); *B60K 1/04* (2013.01); *B60K 6/24* (2013.01);
(Continued)

(58) Field of Classification Search
CPC ........ B60K 17/354; B60K 6/52; B60K 17/34; B60K 17/348; B60K 23/08;
(Continued)

(56) References Cited

U.S. PATENT DOCUMENTS

| 871,098 A | 11/1907 | Albrecht |
| 3,057,427 A | 10/1962 | Glasgow |

(Continued)

FOREIGN PATENT DOCUMENTS

| CH | 462878 A | * 9/1968 | ............... B60K 1/02 |
| JP | 2009241663 | 10/2009 | |
| JP | 2010052603 | 3/2010 | |

OTHER PUBLICATIONS

Rexroth Bosch Group Press Release for All-Wheel Drive on Demand, P1006/13, Jan. 29, 2013.
Silverwolf Motors 4WD Conversion Kit Brochure, 2013.

*Primary Examiner* — Jacob D Knutson
(74) *Attorney, Agent, or Firm* — Neal, Gerber & Eisenberg LLP

(57) ABSTRACT

A drive system for a vehicle having a rear drive assembly having a first pair of axles drivingly engaged to a pair of rear wheels, a single front drive assembly in selective electrical communication with a power source and having a second pair of axles drivingly engaged to a pair of front wheels, a selector switch having a first position which prevents electrical communication between the front drive assembly and the power source and a second position which places the front drive assembly in electrical communication with the power source, where the rear drive assembly can power the vehicle when the selector switch is in the first position, and both the rear drive assembly and the front drive assembly can power the vehicle when the selector switch is in the second position.

18 Claims, 5 Drawing Sheets

Related U.S. Application Data continuation of application No. 13/161,442, filed on Jun. 15, 2011, now Pat. No. 8,708,074.

(60) Provisional application No. 61/355,021, filed on Jun. 15, 2010.

(51) Int. Cl.

| | | |
|---|---|---|
| *B60K 17/348* | (2006.01) | |
| *B60K 1/02* | (2006.01) | |
| *B60K 1/04* | (2019.01) | |
| *B60K 6/52* | (2007.10) | |
| *B60K 6/26* | (2007.10) | |
| *B60K 6/28* | (2007.10) | |
| *B60K 6/24* | (2007.10) | |
| *B60K 6/48* | (2007.10) | |
| *B60L 11/18* | (2006.01) | |
| *B60K 6/36* | (2007.10) | |
| *B60K 23/08* | (2006.01) | |
| *B60K 1/00* | (2006.01) | |

(52) U.S. Cl.
CPC ............ *B60K 6/26* (2013.01); *B60K 6/28* (2013.01); *B60K 6/36* (2013.01); *B60K 6/48* (2013.01); *B60K 6/52* (2013.01); *B60K 17/348* (2013.01); *B60K 17/356* (2013.01); *B60K 23/08* (2013.01); *B60L 11/1805* (2013.01); *B60L 11/1861* (2013.01); *B60L 11/1877* (2013.01); *B60K 2001/001* (2013.01); *B60K 2001/0416* (2013.01); *B60K 2023/0858* (2013.01); *B60K 2023/0891* (2013.01); *B60L 2220/20* (2013.01); *B60L 2220/42* (2013.01); *B60L 2250/26* (2013.01); *B60L 2260/28* (2013.01); *B60Y 2200/223* (2013.01); *B60Y 2200/91* (2013.01); *B60Y 2200/92* (2013.01); *B60Y 2300/92* (2013.01); *B60Y 2400/112* (2013.01); *B60Y 2400/602* (2013.01); *B60Y 2400/604* (2013.01); *B60Y 2400/61* (2013.01); *B60Y 2400/82* (2013.01); *Y10S 903/905* (2013.01); *Y10S 903/906* (2013.01); *Y10S 903/907* (2013.01); *Y10S 903/91* (2013.01); *Y10S 903/916* (2013.01); *Y10S 903/918* (2013.01)

(58) Field of Classification Search
CPC .............. B60L 11/1803; B60L 11/1805; B60L 11/1864; B60W 10/08
USPC .................................................... 180/65.512
See application file for complete search history.

(56) References Cited

U.S. PATENT DOCUMENTS

| | | |
|---|---|---|
| 3,186,506 A | 6/1965 | Leach et al. |
| 4,796,720 A | 1/1989 | Bauer |
| 5,782,717 A | 7/1998 | Smothers et al. |
| 5,921,338 A | 7/1999 | Edmondson |
| 6,145,409 A | 11/2000 | Auer |
| 6,401,850 B1 | 6/2002 | Bowen |
| 6,481,519 B1 | 11/2002 | Bowen |
| 6,484,834 B2 | 11/2002 | Bowen et al. |
| 6,595,308 B2 | 7/2003 | Bowen |
| 6,604,591 B2 | 8/2003 | Bowen et al. |
| 6,856,035 B2 | 2/2005 | Brandon et al. |
| 7,004,018 B2 | 2/2006 | Kadota et al. |
| 7,017,327 B2 | 3/2006 | Hunt et al. |
| 7,114,589 B2 | 10/2006 | Kowatari et al. |
| 7,392,875 B2 * | 7/2008 | Matsuzaki ............... B60K 6/52 180/247 |
| 7,451,850 B2 | 11/2008 | Tokunou |
| 7,454,907 B1 | 11/2008 | Hauser et al. |
| 7,597,160 B2 | 10/2009 | Lawson, Jr. |
| 7,721,517 B2 | 5/2010 | Hunt et al. |
| 8,504,249 B2 | 8/2013 | Miller et al. |
| 8,504,250 B2 | 8/2013 | Reiter et al. |
| 8,670,887 B2 | 3/2014 | Nishimori et al. |
| 8,708,074 B1 | 4/2014 | McCoy et al. |
| 9,765,826 B2 * | 9/2017 | Nishimoto ............. F16D 11/14 |
| 2006/0124374 A1 * | 6/2006 | Katada .................... B60K 6/52 180/233 |
| 2006/0231314 A1 * | 10/2006 | Homan .................. B60K 23/08 180/233 |
| 2007/0029126 A1 * | 2/2007 | Shigeta ............ B60W 30/1843 180/247 |
| 2007/0084659 A1 * | 4/2007 | Hamrin ................ B60K 28/165 180/233 |
| 2008/0004780 A1 * | 1/2008 | Watanabe ............. B60K 6/365 701/54 |
| 2008/0018269 A1 | 1/2008 | Wyatt et al. |
| 2008/0190675 A1 * | 8/2008 | Itoh ........................ B60K 6/52 180/243 |
| 2008/0223634 A1 * | 9/2008 | Yamamoto ............... B60K 6/52 180/65.285 |
| 2008/0277188 A1 | 11/2008 | Hauser et al. |
| 2009/0024262 A1 | 1/2009 | Amamiya |
| 2009/0065273 A1 | 3/2009 | Wyatt et al. |
| 2009/0088914 A1 * | 4/2009 | Mizutani .................. B60K 1/02 701/22 |
| 2010/0004090 A1 * | 1/2010 | Mizutani ................. B60K 6/52 477/7 |
| 2010/0018727 A1 | 1/2010 | Carlton et al. |
| 2010/0193269 A1 | 8/2010 | Fuchtner et al. |
| 2012/0024614 A1 | 2/2012 | Sigmund et al. |
| 2012/0260758 A1 * | 10/2012 | Arai ..................... B60K 17/348 74/405 |

\* cited by examiner

SELECTABLE FOUR-WHEEL DRIVE SYSTEM

CROSS REFERENCE

This application is a divisional of U.S. patent application Ser. No. 14/263,541, filed Apr. 28, 2014, which is a continuation of U.S. patent application Ser. No. 13/161,442, filed on Jun. 15, 2011, now U.S. Pat. No. 8,708,074, which claims the benefit of U.S. Provisional Patent Application No. 61/355,021 filed on Jun. 15, 2010. The terms of all of these prior applications are incorporated herein by reference in their entirety.

FIELD OF THE INVENTION

This invention relates to drive systems for utility vehicles, such as ride-on mowers, and is useful for, among other things, selectively mating the operation of an electric front-wheel drive assembly to that of a conventional rear-wheel drive assembly, such as a hydrostatic, toroidal, continuously variable (CVT) or gear drive assembly powered by a prime mover.

Utility vehicles can be called upon to operate under severe conditions of load and terrain. It has proven useful to have four-wheel drive capability on slopes and rough terrain. Ride-on mowers, for instance, benefit from having front steering and drive capability while traversing the face of a slope. Various four-wheel drive systems are known in the art, combining the same or similar drive systems at the front and rear of the vehicle on a full-time or selectable basis. Hybrid systems are known to alternate or combine power delivery from a combustion engine and an electric motor to a common transmission or transaxle, requiring complex control systems.

SUMMARY OF THE INVENTION

This invention relates to a selectable four-wheel drive system for a utility vehicle that pairs an electric front-wheel drive assembly with a conventional rear-wheel drive assembly powered by a prime mover, such as a combustion engine or an electric motor. Coordination of the drive systems may be accomplished through a combination of manual and electronic controls; for example, an accelerator pedal can have both a mechanical linkage to the conventional rear-wheel drive assembly and a position sensor in electronic communication with a processor controlling the output of the electric front-wheel drive assembly. The electric front-wheel drive assembly can take the form of an electric transaxle complete with reduction gearing and a differential engaged to a pair of axles, a pair of independent electric transaxles, each having a single drive axle (obviating the need for a differential), a pair of independent electric motors, or, in limited applications, a single electric motor having a through-shaft that drives both front wheels. The electric front-wheel drive assembly further includes steering capability that ranges from manual steering linkages to electric steering via auxiliary and/or servo motor. Electric steering signals corresponding to operator inputs may be provided by a position sensor on a rotating steering column or other steering means, such as the control sticks of a zero-turn vehicle. These electronic steering signals are received by one or more processors that control the output of the electric front-wheel drive assembly and may additionally control the output of the conventional rear-wheel drive assembly via an electric actuator, for example, engaged to the control arm responsible for a transaxle's output. These various drive and control combinations work in unison to provide vehicle control and stability when needed in severe environments. An operator-controlled activation switch is utilized to selectively place the drive system in two-wheel or four-wheel mode, enabling control and energy management of the utility vehicle. Other switches and sensors, such as a full-throttle confirmation switch, a pressure transducer or switch, and various speed sensors may be utilized to provide additional control of the selectable four-wheel drive system.

A better understanding of the objects, advantages, features, properties and relationships of the invention will be obtained from the following detailed description and accompanying drawings which set forth illustrative embodiments and are indicative of the various ways in which the principles of the invention may be employed.

DETAILED DESCRIPTION OF THE DRAWINGS

Figure 1:
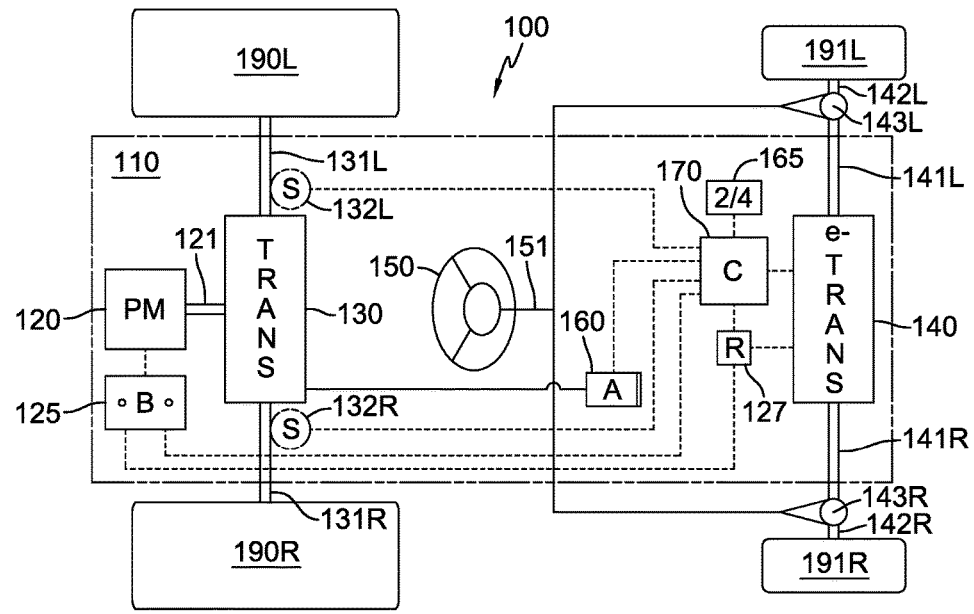
FIG. 1 is a schematic representation of an embodiment of a selectable four-wheel drive system having optional speed sensors on the rear-wheel drive.

FIGS. 1-9 depict various embodiments of a selectable four-wheel drive system in accordance with the principles of the invention, wherein like reference numerals refer to like elements. However, sometimes these elements may be labeled with differing numbers or serial numbers in cases where such labeling facilitates a more clear description. For example, the high capacity alternators depicted in six of the nine disclosed embodiments are serially numbered as 228, 428, 628, 728, 828 and 928, respectively, to ease recognition. The disclosed embodiments are merely illustrative of the manner in which the elements described herein may be combined to form a selectable four-wheel drive system and are not meant to be limiting.

FIG. 1 depicts a utility vehicle 100 having a first embodiment of a selectable four-wheel drive system 110 in accordance with the principles of the invention. Prime mover 120, preferably an internal combustion engine, but optionally an electric motor in communication with drive controller 170, powers transaxle 130 via output shaft 121. It will be understood that output shaft 121 can be directly linked to transaxle 130 or indirectly linked by a conventional belt and pulley arrangement (not shown). Such an indirect arrangement may permit prime mover 120 to additionally power work implements, such as a mower deck (not shown), through a second belt and pulley arrangement (not shown) engaged to output shaft 121. Drive controller 170 is preferably a processor-based controller utilizing one or more processors (not shown), but may also be a programmable logic controller (PLC) or other logic-circuitry based controller.

Transaxle 130 drives rear wheels 190L and 190R via corresponding drive axles 131L and 131R. Transaxle 130 may be hydrostatic, toroidal, continuously variable (CVT) or gear-driven in nature. An operator controls the output of transaxle 130 through use of a mechanical linkage to accelerator pedal 160. Accelerator pedal 160 has both forward and reverse modes of travel, such as enabled by a rocker-style pedal. It will be understood that accelerator pedal 160 can be replaced by other input devices known in the art, such as a hand control or separate forward and reverse pedals. The mechanical linkage affects movement of a control arm (not shown) that varies the output of transaxle 130. The workings of a control arm on a representative hydrostatic transaxle are described in detail in commonly owned U.S. Pat. No. 7,454,907, the disclosure of which is incorporated by reference herein. To improve the operation of transaxle 130, a differential mechanism (not shown) permits drive axles 131L and 131R to rotate at different rates during turns or on uneven terrain. The operation of a differential mechanism is well known in the art, such as that described in commonly owned U.S. Pat. No. 5,782,717 which is incorporated by reference herein.

Accelerator pedal 160 communicates electronically with the drive controller 170 for electric transaxle 140 through a position sensor (not shown), such as a potentiometer. This input is used by drive controller 170 to match the output speed of electric transaxle 140 with that of rear transaxle 130. The drive signal supplied by drive controller 170 dictates the output speed of the electric motor (not shown) of electric transaxle 140, which may be adjusted based on current, voltage or frequency. The contemplated control algorithms must account for, among other parameters, the relative wheel diameters of front wheels 191L and 191R, and rear wheels 190L and 190R, along with the relative reduction capability of the respective drive units. This prevents a push-pull effect between rear transaxle 130 and electric transaxle 140. Additional signals can be provided to drive controller 170 by optional speed sensors 132L and 132R. These sensors can be installed adjacent to drive axles 131L and 131R to provide precise data on the rotational speed of the monitored axles to drive controller 170.

The power source for electric transaxle 140 is a battery 125, which may represent one battery, or any number of batteries joined in series to achieve the proper system voltage. By way of example and without limitation, the motor of electric transaxle 140 may operate as part of a 24V, 36V or 48V system. An operator activates the four-wheel drive mode of the selectable four-wheel drive system 110 by closing activation switch 165, which communicates the operator's intent to drive controller 170; whereupon, in some applications, such as DC brushed electric motor applications, drive controller 170 closes relay 127 to supply power from battery 125 to electric transaxle 140. In other applications, such as AC, brushless DC or similar electric motor applications, drive controller 170 closes relay 127 to supply power from battery 125 to a portion of the drive controller capable of handling high power, which then powers electric transaxle 140. In certain situations, relay 127 prevents an overcharging situation for battery 125.

Steering for utility vehicle 100 is provided by a manual assembly, depicted in the figures as a steering wheel 150 and column 151 mechanically linked to pivoting members 143L and 143R, which are typically steering knuckles or other known pivoting joint arrangements. The axle shafts for the front-wheel drive mechanism articulate to accommodate steering. Accordingly, in a particular embodiment, left-side front wheel 191L is driven by a two-part axle shaft consisting of axle shafts 141L and 142L joined by a u-joint or Cardan joint (not shown), or other means known in the art. In such an embodiment, right-side front wheel 191R is driven by a similar two-part axle shaft consisting of axle shafts 141R and 142R.

Figure 2:
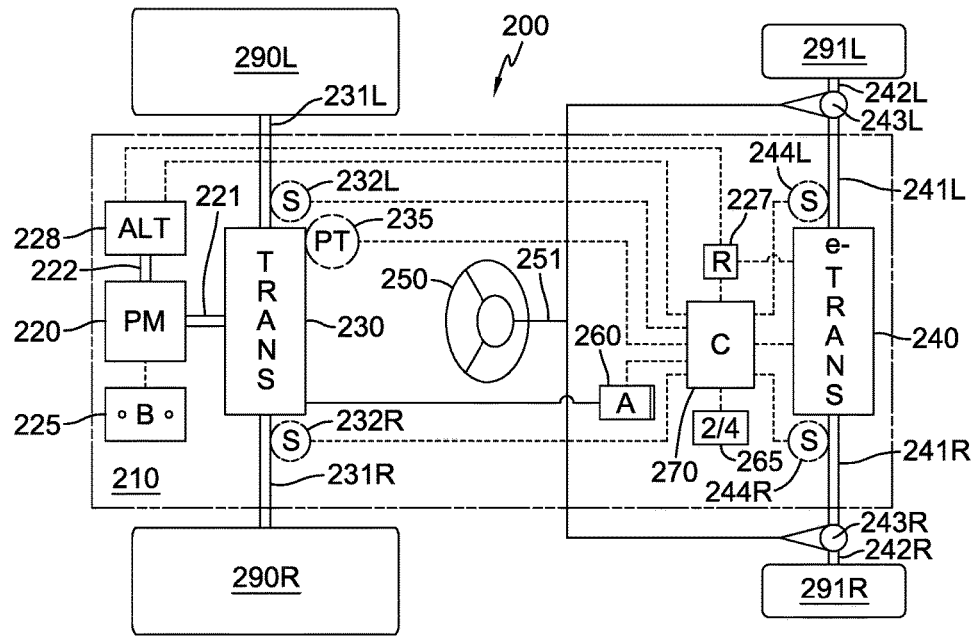
FIG. 2 is a schematic representation of another embodiment of a selectable four-wheel drive system having optional speed sensors on both the front and rear-wheel drives.

A more precise correspondence of front and rear axle speeds can be accomplished by incorporation of speed sensors 244L and 244R on front axles 241L and 241R as illustrated for a selectable four-wheel drive system 210 in FIG. 2. In addition to the feedback provided by speed sensors 232L and 232R, the processor of drive controller 270 now receives feedback from speed sensors 244L and 244R, permitting more precise control of the current delivered to the electric motor (not shown) of electric transaxle 240. Varying conditions and loads may require additional current be supplied to electric transaxle 240 to achieve a given rotational speed at output axles 241L and 241R. To more precisely steer utility vehicle 200, and to prevent skidding of tires, electric transaxle 240 may incorporate a differential (not shown) that permits the inside wheel in a given turn (e.g. front-wheel 291L in a left-hand turn) to rotate more slowly than the outside wheel (e.g. front-wheel 291R in a left-hand turn). The inclusion of the differential is particularly useful in utility vehicles slated for lawn mowing applications as this capability prevents scuffing of the lawn during turns.

FIG. 2 also depicts the use of a pressure transducer or switch 235 in association with rear transaxle 230, which in the case of a hydrostatic transaxle, permits drive controller 270 to monitor pressure (which corresponds to loading) within the closed hydraulic loop (not shown) of rear transaxle 230. Additional loading will be experienced by the hydraulic system on uphill slopes, rough terrain or with additional vehicle weight. A pressure threshold limit can be programmed into the processor of drive controller 270 which engages the front-wheel drive when the threshold is exceeded and activation switch 265 is in two-wheel mode. Alternatively, activation switch 265 can be eliminated, automating the function through the communication between pressure transducer or switch 235 and drive controller 270.

FIG. 2 further illustrates an alternative means for powering electric transaxle 240. In this instance, a high capacity alternator 228 is driven by an output shaft 222 of prime mover 220. Alternately, a belt and pulley arrangement may be used to drive both rear transaxle 230 and alternator 228 from a single output shaft. Regardless of driving means, DC current is directly provided to electric transaxle 240 by high capacity alternator 228, as opposed to providing stored power from a battery source. The voltage of high capacity alternator 228 is matched to the system voltage (24V, 36V, 48V, etc.). This presumes any motor driven by high capacity alternator 228 is a DC motor with the same voltage requirements. In this embodiment, battery 225 provides power during startup of prime mover 220 and during any diagnostic functions of controller 270 (connection not shown). In AC motor applications, a generator may be utilized in lieu of the high capacity alternator 228.

Figure 3:
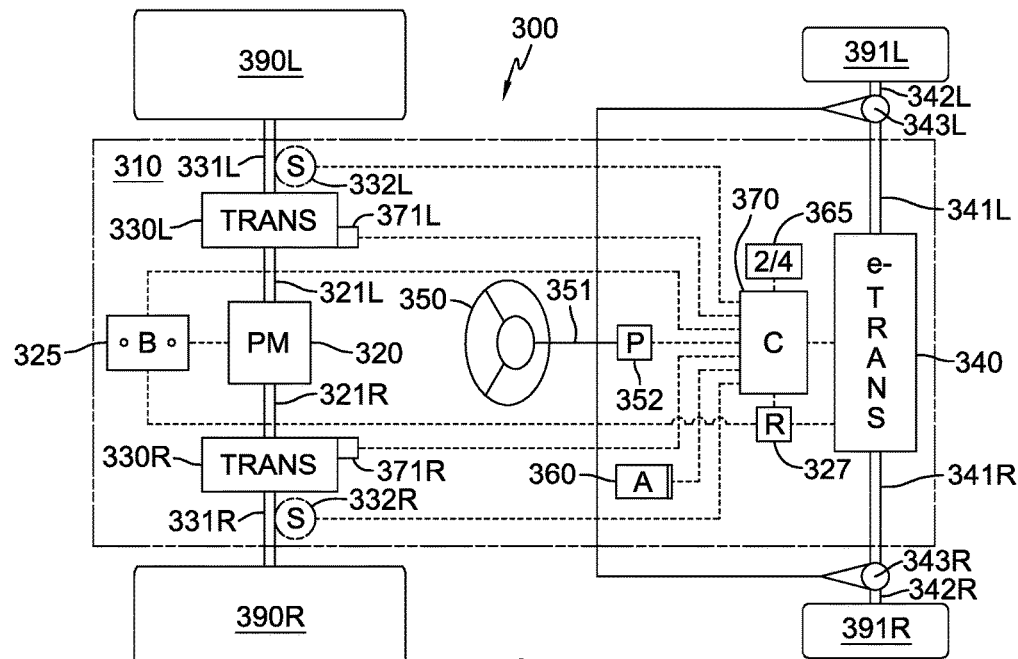
FIG. 3 is a schematic representation of a further embodiment of a selectable four-wheel drive system having independent rear-wheel drives controlled by electric actuators.

FIG. 3 depicts a utility vehicle 300 incorporating another embodiment of a selectable four-wheel drive system 310. In this embodiment, drive system 310 is similar to drive system 110, except that prime mover 320 drives two separate transaxles 330L and 330R. Transaxle 330L drives rear wheel 390L via corresponding drive axle 331L, and transaxle 330R drives rear wheel 390R via corresponding drive axle 331R. This configuration provides utility vehicle 300 with zero-turn capability, such as commonly seen in commercial mowing vehicles. The speed and rotational direction of drive axles 331L and 331R are independently controlled to produce varying degrees of turn in utility vehicle 300 up to and including a vehicle rotation about a center point along the line between transaxle 330L and transaxle 330R (essentially a rotation about prime mover 320 in FIG. 3). Prime mover 320 is drivingly linked to transaxles 330L and 330R by output shafts 321L and 321R, respectively. Alternatively, prime mover 320 can employ a single output shaft (not shown) to drive transaxles 330L and 330R by means of a conventional belt and pulley arrangement (not shown).

The output of transaxles 330L and 330R are respectively controlled by a pair of electric actuators 371L and 371R in communication with drive controller 370. Each actuator 371L and 371R is engaged to a respective control arm (not shown) of transaxles 330L and 330R. This arrangement presumes that the control arm is attached to a rotatable control shaft (e.g., the trunnion shaft of a hydrostatic transaxle) and that the electric actuators are linear in design. In an alternate arrangement, a rotary actuator can be directly attached to the control shaft of a representative transaxle. One or more processors of drive controller 370 receive input signals from a position sensor associated with accelerator pedal 360 and a steering position sensor 352 engaged to steering column 351. The position sensors may be potentiometers, for example. The input signals are processed in conjunction with any feedback signals, such as those produced by optional speed sensors 332L and 332R, in accordance with programmed algorithms or circuit logic related to vehicle drivability (allowable turn rates, acceleration, etc.), e.g. that disclosed in U.S. Patent Application Publication No. 2008/0018269, incorporated herein by reference for all purposes. Drive controller 370 then controls the movement of electric actuators 371L and 371R to produce the drive outcome specified by the operator of vehicle 300.

Selectable four-wheel drive system 310 further directs the output of electric transaxle 340 when activation switch 365 is closed by the operator. The input signals and feedback signals used in directing the movement of electric actuators 371L and 371R are evaluated by the one or more processors of drive controller 370 to direct the output of electric transaxle 340. As previously discussed for drive systems 110 and 210, coordination of the output of electric transaxle 340 with that of the rear transaxles 330L and 330R, requires drive controller 370 to account for many factors that will ultimately result in the relative axle output speeds at drive axles 331L, 331R, 341L and 341R necessary to effect the desired vehicle path in terms of speed and direction. In the absence of speed sensor feedback on front drive axles 341L and 341R, drive controller 370 may estimate front drive axle speeds as a function of the current applied to the electric motor (not shown) of electric transaxle 340.

Figure 4:
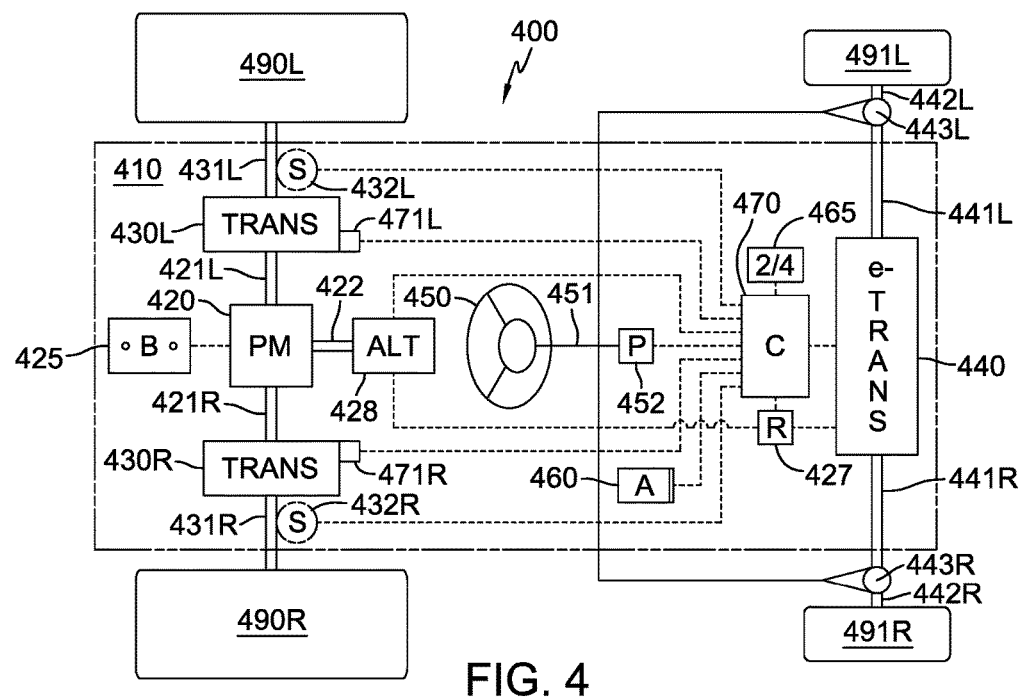
FIG. 4 is a schematic representation of another embodiment of a selectable four-wheel drive system having independent rear-wheel drives and an alternator providing power to the front-wheel drive assembly.

FIG. 4 depicts a utility vehicle 400 incorporating an additional embodiment of a selectable four-wheel drive system 410. In this embodiment, drive system 410 is a combination of elements previously depicted in drive systems 310 and 210. Drive system 410 includes a drive controller 470 that regulates the movement of a pair of actuators 471L and 471R to control the output of rear transaxles 430L and 430R, respectively, and selectively controls the output of an electric transaxle 440. Drive system 410 further includes a high output alternator 428 driven by an output shaft 422 of prime mover 420 in the same manner as depicted in drive system 210. Alternator 428 provides a particular advantage over the fixed storage capacity of an array of batteries in certain applications. In such applications, alternator 428 provides a continuous source of power for electric transaxle 440 as compared to having a limited four-wheel drive run time associated with the array of batteries, which require recharging after use.

Figure 5:
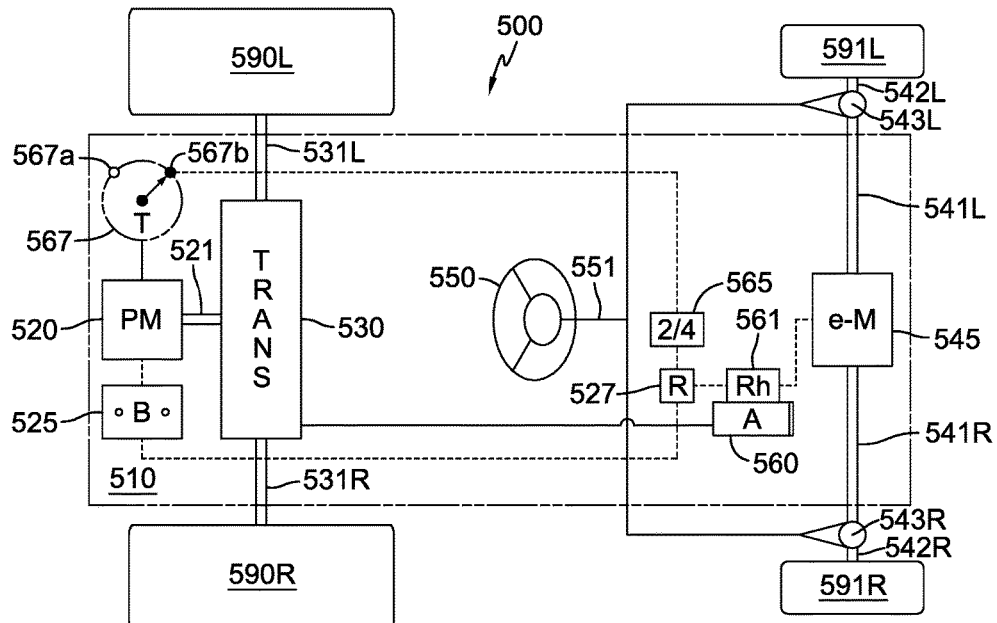
FIG. 5 is a schematic representation of an embodiment of a simple four-wheel drive system utilizing an electric motor as the front-wheel drive and having a full-throttle confirmation switch.

FIG. 5 depicts a utility vehicle 500 incorporating another embodiment of a selectable four-wheel drive system 510. Drive system 510 is a simplified system that mates a rear transaxle with an assist provided by an electric motor 545, such as a DC electric motor, having a through-shaft (not shown) engaged to a pair of two-piece axles 541L/542L and 541R/542R, which power both front wheels 591L and 591R. In the depicted embodiment, drive system 510 does not include a controller, steering position sensor, accelerator position sensor, or a set of speed sensors associated with the drive axles.

Drive system 510 utilizes a full-throttle confirmation switch 567 that allows engagement of four-wheel drive only when prime mover 520 is set at full throttle, which moves switch 567 from an open position 567a to a closed position 567b. When full-throttle confirmation switch 567 is in its closed position 567b and four-wheel drive mode is selected via activation switch 565, relay 527 closes to allow power from battery 525 to drive electric motor 545. In this embodiment, the output of electric motor 545 is controlled by rheostat 561 engaged to accelerator pedal 560. The output of rear transaxle 530 is controlled by a mechanical linkage connected to the control arm (not shown) of rear transaxle 530.

In the absence of a controller, full-throttle confirmation switch 567 ensures that the output of rear transaxle 530, for a given displacement of accelerator pedal 560, is predictable. Consequently, it is possible to calibrate rheostat 561 to produce a mating output speed at electric motor 545 for the selected displacement of accelerator pedal 560. If electric motor 545 is not mated to a differential, selection of four-wheel drive mode is best suited to straight line use applications. In that instance, an optional steering position switch (not shown), which remains open unless the steering mechanism is within a limited number of degrees of straight line tracking, could be used in combination with activation switch 565 to lockout four-wheel drive selection and use during off-center positioning of the steering mechanism.

Figure 6:
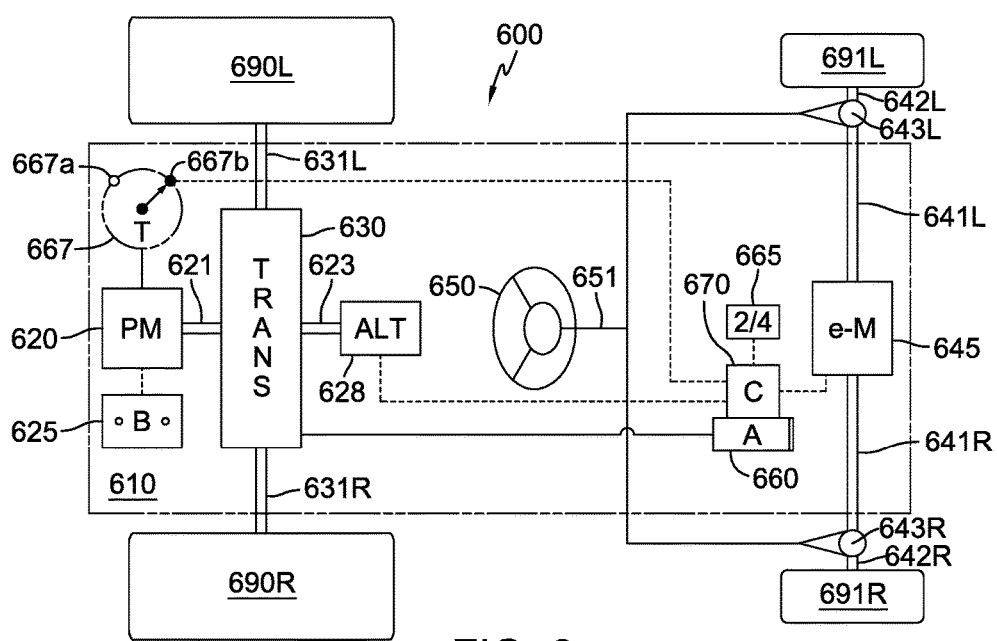
FIG. 6 is a schematic representation of another embodiment of a simple four wheel drive system in which a full-throttle confirmation switch communicates directly with the controller of the front-wheel drive's electric motor.

FIG. 6 depicts a utility vehicle 600 incorporating an additional embodiment of a selectable four-wheel drive system 610. Similar to drive system 510, drive system 610 includes a full-throttle confirmation switch 667 having an open position 667a and a closed position 667b. In drive system 610, full-throttle confirmation switch 667 directs power to a DC motor controller 670, such as a bi-directional DC motor speed controller. When full-throttle confirmation switch 667 is in its closed position 667b, and four-wheel drive mode is selected via activation switch 665, motor controller 670 allows power to be supplied to electric motor 645 from a high capacity alternator 628 in an amount determined by the selected displacement of accelerator pedal 660. In addition to ensuring a known output from rear transaxle 630 for a given displacement of accelerator pedal 660, the use of full-throttle confirmation switch 667 in conjunction with high capacity alternator 628 ensures that the output of high capacity alternator 628 is maximized. In this embodiment, prime mover 620 drives transaxle 630 via output shaft 621 and transaxle 630 drives alternator 628 via transaxle output shaft 623. Alternatively, transaxle 630 and alternator 628 can both be driven by means of a conventional belt and pulley arrangement (not shown) engaged to output shaft 621 of prime mover 620.

Figure 7:
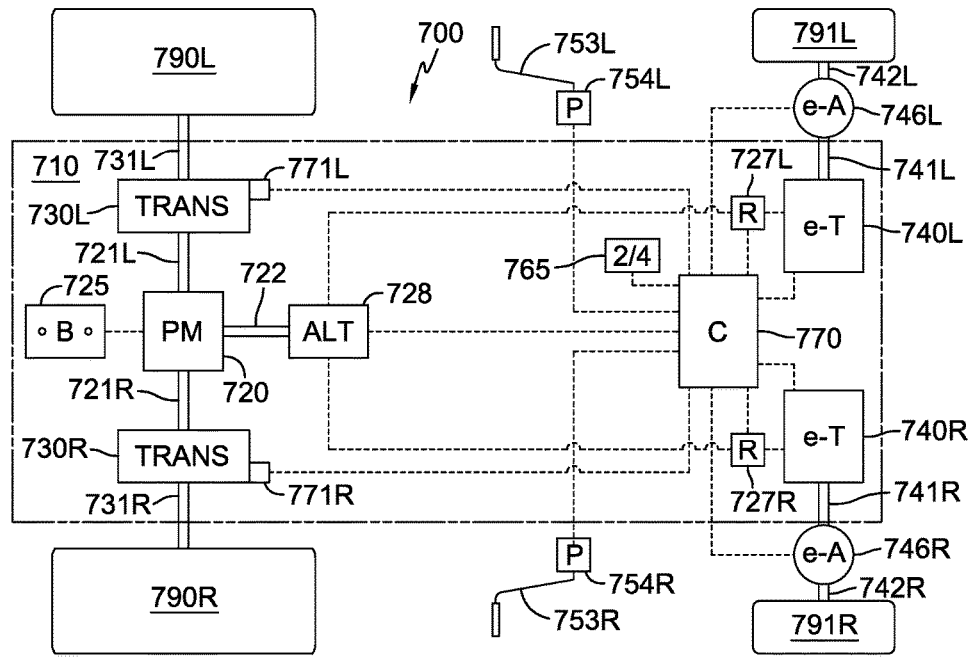
FIG. 7 is a schematic representation of an embodiment of a selectable four-wheel drive system applied to a zero-turn vehicle utilizing individual electric drives at each front wheel and electric steering.

FIG. 7 depicts a utility vehicle 700 incorporating another embodiment of a selectable four-wheel drive system 710. The rear-wheel drive assembly of drive system 710 is configured similar to drive system 410, except optional speed sensors are not shown adjacent drive axles 731L and 731R. As in drive systems 210 and 410, however, speed sensors could be applied to the front and/or rear drive axles of drive system 710.

Utility vehicle 700 is equipped with control sticks 753 L and 753R for operator control inputs in place of a steering wheel and accelerator pedal. Typical of zero-turn vehicles, control sticks 753L and 753R provide steering, speed and direction inputs from an operator to drive system 710, or more specifically, to drive controller 770. Presuming four-wheel drive mode is engaged by closing activation switch 765, a vertical position of control stick 753L corresponds to a neutral position for rear transaxle 730L and electric transaxle 740L, while pushing control stick 753L forward corresponds to forward travel imparted to the left side of utility vehicle 700 by rear transaxle 730L and electric transaxle 740L. Speed increases in a forward direction as control stick 753L moves farther away from its vertical neutral position. Similarly, pulling of control stick 753L rearward imparts reverse travel to the left side of utility vehicle 700 by rear transaxle 730L and electric transaxle 740L, with increasing speed imparted as control stick 753L moves farther away from its vertical neutral position. As described for control stick 753L, manipulation of control stick 753R produces corresponding outputs from rear transaxle 730R and electric transaxle 740R.

The position of control sticks 753L and 753R is communicated to one or more processors (not shown) in drive controller 770 by control stick position sensors 754L and 754R, which may be potentiometers, for example. When the default two-wheel drive mode is engaged, the position signals generated by control stick position sensors 754L and 754R are processed by the one or more processors in drive controller 770 to adjust the positions of electric actuators 771L and 771R on rear transaxles 730L and 730R, respectively, in the manner previously described for drive system 310. As a result, drive wheel steering is imparted to utility vehicle 700 through its respective drive axles 731L and 731R and rear wheels 790L and 790R. Zero-turn vehicles having control sticks, such as ride-on mowers, have traditionally positioned front caster wheels on spindles which react to the forces imparted by drive wheel steering to approximate the intended path of the vehicle operator. As previously noted, it is beneficial when traversing the face of a hillside to have a pair of steered and/or powered front wheels. Among other things, such an arrangement mitigates the tendency of the vehicle's nose to point downhill under the influence of gravity. Drive system 710 features a pair of electric auxiliary steering motors 746L and 746R on the spindles or steering knuckles of vehicle 700. The steering inputs of the operator processed by the one or more processors in drive controller 770 result in the generation of control signals from drive controller 770 to the electric auxiliary steering motors 746L and 746R, which in turn pivot the spindles or steering knuckles to adjust the tracking of front wheels 791L and 791R to correspond to the drive wheel steering produced by rear transaxles 730L and 730R. Steering methodologies and mechanisms associated with zero-turn vehicles are described in detail in U.S. Patent Application Publication No. 2008/0277188, the disclosure of which is incorporated by reference herein. Steering methodologies, such as Ackerman steering, can be programmed into drive controller 770 to more precisely track the intended path of the vehicle operator and prevent skidding of front wheels 791L and 791R.

When four-wheel drive mode is selected by closing activation switch 765, drive controller 770 closes relays 727L and 727R to provide power from a high capacity alternator 728 to electric transaxles 740L and 740R. Drive controller 770 processes the input signals from control stick position sensors 754L and 754R to determine the speed and direction of rotation of drive axles 741L and 741R. Drive axles 741L and 741R are each engaged by means of a u-joint or Cardan joint (not shown) to their corresponding pivoting segments 742L and 742R. Because all four wheels of utility vehicle 700 are independently powered in four-wheel drive mode, drive controller 770 can precisely adjust the rotational speeds and directions of drive axles 731L, 731R, 741L and 741R to track the operator's intended path. The inclusion of feedback from a speed sensor (not shown) on each drive axle permits drive controller 770 to increases the precision of the transaxles' coordinated outputs.

Figure 8:
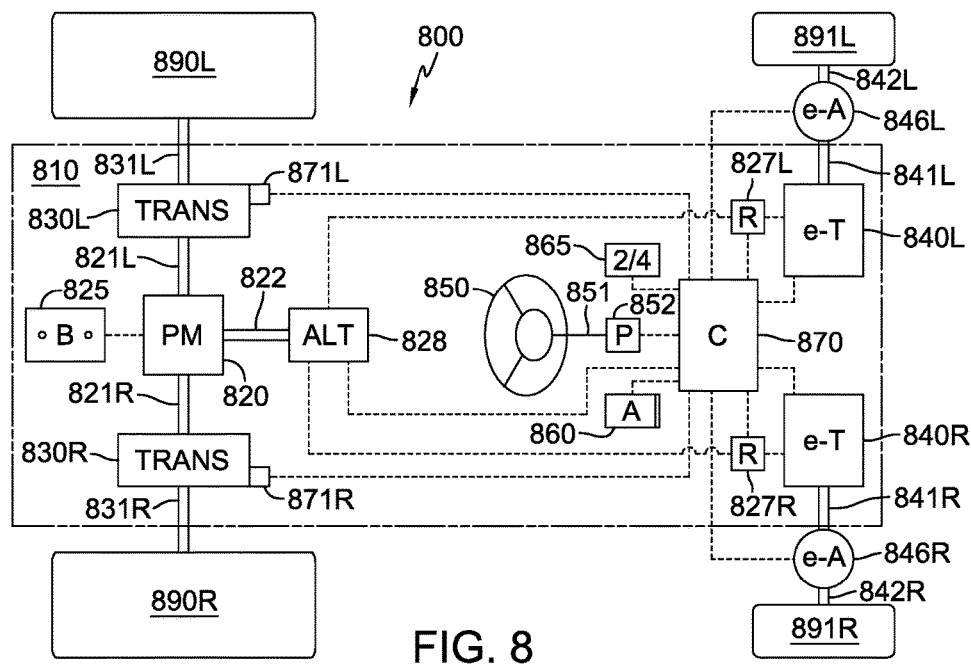
FIG. 8 is a schematic representation of another embodiment of a selectable four-wheel drive system applied to a zero-turn vehicle utilizing a steering wheel and accelerator pedal as the primary operator control inputs for the four independent drives.

FIG. 8 depicts a utility vehicle 800 incorporating another embodiment of a selectable four-wheel drive system 810. Drive system 810 is similar to drive system 710, except for changes to the operator input controls. For steering inputs, drive system 810 employs a steering wheel 850, steering column 851 and a steering position sensor 852, such as a potentiometer, which senses the rotational position of steering column 851. For speed and direction inputs, drive system 810 incorporates an accelerator pedal 860, such as the rocker-style pedal described for drive system 110, which incorporates a position sensor (not shown). These input devices replace the two control sticks responsible for steering, speed and direction inputs in drive system 710. Drive controller 870 receives and processes input signals from the position sensor of accelerator pedal 860 and steering position sensor 852 to control the output of transaxles 830L and 830R, electric transaxles 840L and 840R, and electric auxiliary steering motors 846L and 846R. These changes to the operator input controls and their associated sensors may require modification of the programmed control algorithms or circuit logic resident in drive controller 870, as compared to that resident in drive controller 770. For example, the speed and direction input signals generated by each of the control stick position sensors 754L and 754R, while generally processed independently to power the left and right side transaxles of vehicle 700, must be evaluated jointly in determining steering adjustments to electric auxiliary steering motors 746L and 746R. In contrast, the steering position signal generated by steering position sensor 852 of vehicle 800 primarily determines the adjustments to electric auxiliary steering motors 846L and 846R, subject to limits on the turning radius determined by the speed and direction called for by an operator at accelerator pedal 860.

Figure 9:
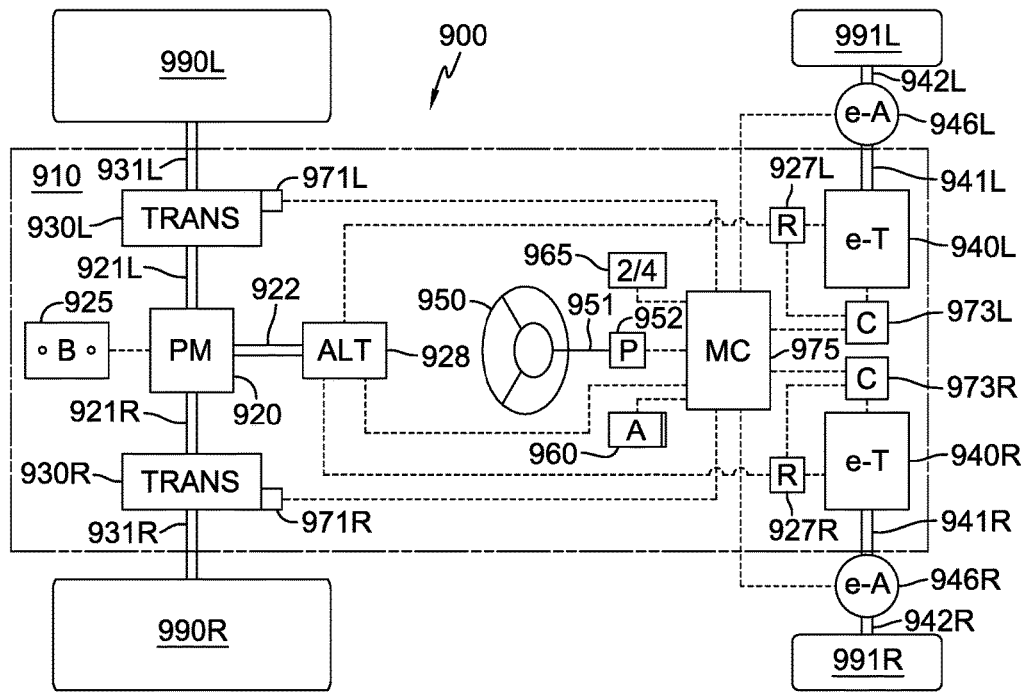
FIG. 9 is a schematic representation of another embodiment of a selectable four-wheel drive system applied to a zero-turn vehicle utilizing individual controllers for each electric drive and a master controller.

FIG. 9 depicts a utility vehicle 900 incorporating an additional embodiment of a selectable four-wheel drive system 910. Drive system 910 is similar to drive system 810, except drive system 910 includes a master controller 975 and two slave controllers 973L and 973R. Master controller 975 receives and processes input signals from a position sensor (not shown) of accelerator pedal 960 and steering position sensor 952, and also checks the status of four-wheel drive activation switch 965 to generate output control signals to electric actuators 971L and 971R (which control the outputs of transaxles 930L and 930R, respectively), electric auxiliary steering motors 946L and 946R, and, in the event activation switch 965 is closed, slave controllers 973L and 973R. Slave controllers 973L and 973R communicate with master controller 975 to open relays 927L and 927R and to provide output control signals to electric transaxles 940L and 940R. Master controller 975 can also be used to manage the power usage and distribution of drive system 910. The coordinated relationship and communication methods employed by master and slave controllers in powering electric transaxles and auxiliary units is described in detail in U.S. Patent Application Publication No. 2009/0065273, the disclosure of which is incorporated by reference herein.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention.

What is claimed is:

1. A drive system for a vehicle having a pair of front wheels and a pair of rear wheels, the drive system comprising:
    a rear drive assembly having a first pair of axles extending from opposite sides of the vehicle, each axle of the first pair of axles drivingly engaged to one of the pair of rear wheels;
    a prime mover drivingly engaged to the rear drive assembly;
    a power source disposed on the vehicle;
    a front drive assembly in selective electrical communication with the power source and comprising a single drive apparatus, and a second pair of axles extending from the opposite sides of the vehicle, wherein each axle of the second pair of axles is drivingly engaged to one of the pair of front wheels;
    a steering mechanism in communication with the pair of front wheels;
    an accelerator mechanism in communication with the rear drive assembly and the front drive assembly;
    a selector switch, wherein the selector switch has a first position which prevents electrical communication between the front drive assembly and the power source, and a second position which places the front drive assembly in electrical communication with the power source; and
    an output capacity sensor disposed on the vehicle to detect an output of the prime mover;
    wherein the rear drive assembly drives the vehicle when the selector switch is in the first position; and
    wherein both the rear drive assembly and the front drive assembly drive the vehicle when the selector switch is in the second position and the output capacity sensor detects that the output of the prime mover meets a threshold output.

2. The drive system of claim 1, wherein the single drive apparatus comprises a DC electric motor drivingly engaged to each axle of the second pair of axles.

3. The drive system of claim 2, wherein the accelerator mechanism controls the DC electric motor through a bi-directional DC motor speed controller.

4. The drive system of claim 3, wherein the output capacity sensor is a full-throttle confirmation switch in communication with the prime mover and the bi-directional DC motor speed controller, wherein when the full-throttle confirmation switch is in a closed position corresponding to the threshold output and the selector switch is in the second position, electric power is supplied to the DC electric motor in an amount determined by a selected displacement of the accelerator mechanism.

5. The drive system of claim 4, wherein the power source is a high capacity alternator.

6. The drive system of claim 2, wherein the accelerator mechanism controls the DC electric motor through a rheostat.

7. The drive system of claim 6, wherein the output capacity sensor is a full-throttle confirmation switch in communication with the prime mover and a relay, wherein when the full-throttle confirmation switch is in a closed position corresponding to the threshold output and the selector switch is in the second position, the relay closes to permit electric power to be supplied to the DC electric motor in an amount determined by a selected displacement of the accelerator mechanism.

8. The drive system of claim 1, wherein the power source is a high capacity alternator.

9. The drive system of claim 1, comprising a first position sensor in communication with the steering mechanism and a drive controller for generating a first positional signal.

10. The drive system of claim 9, wherein the steering mechanism comprises a steering wheel connected to a steering shaft whose rotational position is reported as the first positional signal.

11. The drive system of claim 10, wherein a second positional signal is communicated to the drive controller by the accelerator mechanism.

12. The drive system of claim 11, wherein the first positional signal and the second positional signal are resolved by the drive controller to independently coordinate a first speed and a first rotational direction of the pair of rear wheels, a second speed and a second rotational direction of the pair of front wheels, and a steered position of the pair of front wheels.

13. The drive system of claim 1, wherein the output capacity sensor is a full-throttle confirmation switch.

14. A drive system for a vehicle having a pair of front wheels and a pair of rear wheels, the drive system comprising:
    a rear drive assembly having a first pair of axles extending from opposite sides of the vehicle, each axle of the first pair of axles drivingly engaged to one of the pair of rear wheels;
    a prime mover drivingly engaged to the rear drive assembly;
    a power source disposed on the vehicle;
    a front drive assembly in selective electrical communication with the power source and comprising a single electric transaxle, and a second pair of axles extending from the opposite sides of the vehicle, wherein each axle of the second pair of axles is drivingly engaged to one of the pair of front wheels and to the single electric transaxle;
a steering mechanism in communication with the pair of front wheels;
an accelerator mechanism in communication with the rear drive assembly and the front drive assembly;
a selector switch, wherein the selector switch has a first position which prevents electrical communication between the front drive assembly and the power source, and a second position which places the front drive assembly in electrical communication with the power source;
an output capacity sensor disposed on the vehicle to detect an output of the prime mover;
wherein the rear drive assembly drives the vehicle when the selector switch is in the first position; and
wherein both the rear drive assembly and the front drive assembly drive the vehicle when the selector switch is in the second position and the output capacity sensor detects that the output of the prime mover meets a threshold output.

15. The drive system of claim 14, comprising a first position sensor in communication with the steering mechanism and a drive controller for generating a first positional signal.

16. The drive system of claim 15, wherein the steering mechanism comprises a steering wheel connected to a steering shaft whose rotational position is reported as the first positional signal.

17. The drive system of claim 16, wherein a second positional signal is communicated to the drive controller by the accelerator mechanism.

18. The drive system of claim 17, wherein the first positional signal and the second positional signal are resolved by the drive controller to independently coordinate a first speed and a first rotational direction of the pair of rear wheels, a second speed and a second rotational direction of the pair of front wheels, and a steered position of the pair of front wheels.

* * * * *